(12) United States Patent
Brachert et al.

(10) Patent No.: US 7,398,744 B2
(45) Date of Patent: Jul. 15, 2008

(54) METHOD FOR THE OPERATION OF AN INTERNAL COMBUSTION ENGINE

(75) Inventors: Götz Brachert, Stuttgart (DE); Rudiger Herweg, Esslingen (DE); Kai Kanning, Stuttgart (DE); Matthias Pfau, Ludwigsburg (DE); Jochen Schäflein, Stuttgart (DE); Hans-Jürgen Weimann, Oppenweiler (DE)

(73) Assignee: Daimler AG, Stuttgart (DE)

( * ) Notice: Subject to any disclaimer, the term of this patent is extended or adjusted under 35 U.S.C. 154(b) by 211 days.

(21) Appl. No.: 11/453,548

(22) Filed: Jun. 15, 2006

(65) Prior Publication Data

US 2006/0278185 A1   Dec. 14, 2006

Related U.S. Application Data

(63) Continuation-in-part of application No. PCT/EP2004/014339, filed on Dec. 16, 2004.

(30) Foreign Application Priority Data

Dec. 17, 2003   (DE)   ................. 103 59 059

(51) Int. Cl.
*F02B 1/12* (2006.01)
*F01L 1/34* (2006.01)
(52) U.S. Cl. .............. 123/27 R; 123/90.15; 123/DIG. 7
(58) Field of Classification Search ............... 123/27 R, 123/90.15, DIG. 7
See application file for complete search history.

(56) References Cited

U.S. PATENT DOCUMENTS

| 6,267,095 | B1 |   | 7/2001 | Ikeda et al. |
| 6,336,436 | B1 |   | 1/2002 | Miyakubo et al. |
| 6,390,056 | B1 |   | 5/2002 | Hertzberg et al. |
| 6,619,242 | B2 | * | 9/2003 | Kaneko ............... 123/27 R |
| 6,739,295 | B1 | * | 5/2004 | Yamaoka et al. ....... 123/90.15 |
| 2003/0056736 | A1 |   | 3/2003 | Unger et al. |

FOREIGN PATENT DOCUMENTS

| EP | 1 085 192 | 3/2001 |
| EP | 1 233 151 | 8/2002 |
| EP | 1 348 857 | 10/2003 |

* cited by examiner

*Primary Examiner*—Noah Kamen
(74) *Attorney, Agent, or Firm*—Klaus J. Bach

(57) ABSTRACT

In a method of operating a 4-stroke internal combustion engine selectively in a compression ignition operation, in which an outlet valve of the internal combustion engine is closed at a comparatively early closing time point with respect to a crank angle ($\alpha$) and in spark ignition operation, in which the outlet valve is closed at a comparatively late closing time point with respect to the crank angle ($\alpha$), during the changeover from the spark ignition mode of operation to the compression ignition mode of operation, the closing time point of the outlet valve is transferred from the late closing time point to the early closing time point in steps distributed over multiple 4-stroke cycles.

9 Claims, 3 Drawing Sheets

METHOD FOR THE OPERATION OF AN INTERNAL COMBUSTION ENGINE

This is a Continuation-in-Part Application of International Application PCT/EP2004/014339 filed Dec. 16, 2004 and claiming the priority of German application 103 59 059.5 filed Dec. 17, 2003.

BACKGROUND OF THE INVENTION

The invention relates to a method for the operation of an internal combustion engine which can be operated selectively in a compression ignition mode and in a spark ignition mode.

To achieve reduced fuel consumption, 4-stroke internal combustion engines can be operated in different operating modes. In one operating mode with compression ignition, a high efficiency engine operation and, consequently, a low fuel consumption are established. Under corresponding operating conditions with a suitable temperature and with a corresponding cylinder pressure, a homogeneous air/fuel mixture is subjected to autoignition with correspondingly favorable combustion conditions.

Compression ignition operation, however, is restricted to the part-load range, since, with a rising load, the maximum cylinder pressure also rises and may overshoot a permissible value. This results in increased noise emission and in an undesirably high load on the engine components. With higher rotational speeds, furthermore, the knocking tendency of the cylinder charge increases in an undesirable way. A further disadvantage is the exponential rise in the formation of nitrogen oxides as the maximum process temperature rises as a result of excessively high load.

To avoid the disadvantages mentioned, a corresponding internal combustion engine is operated in the higher load range in a second operating mode with conventional spark ignition. In this case, the known Otto-cycle combustion takes place, which is suitable for operation under higher loads.

Particularly in a motor vehicle an internal combustion engine is exposed to changing operating loads. A change between the two operating modes is desired as a function of the prevailing load.

The change between two operating modes may be brought about by a cyclic change in the control times of the corresponding inlet and outlet valves. For this purpose, electromechanical valve controls (EMVS) or electrohydraulic valve controls (EHVS) are known, by means of which the opening and closing times of the inlet and outlet valves can be adapted, as required. By a variation in, for example, the outlet control times, the outlet valve can be closed comparatively early. This causes exhaust gas retention in the cylinders, as a result of which an increased pressure and an increased temperature are established, which lead to compression ignition.

U.S. Pat. No. 6,336,436 discloses a method for the operation of a 4-stroke internal combustion engine, in which a change can be made, as required, between compression ignition operation and spark ignition operation. Adaptation of the valve control times to the respective operating mode by means of a variably adjustable valve drive is proposed. The operating conditions for compression ignition operation with autoignition are set via exhaust gas recirculation.

A disadvantage which became apparent is that, during the change from spark ignition operation to compression ignition operation, while the operating parameters otherwise remain unchanged, an undesirably increased noise emission occurs.

It is the object of the present invention to provide a method by which the changeover between a compression ignition operating mode and a spark ignition operating mode is facilitated.

SUMMARY OF THE INVENTION

In a method of operating a 4-stroke internal combustion engine selectively in a compression ignition operating mode, in which an outlet valve of the internal combustion engine is closed at a comparatively early closing time point with respect to a crank angle ($\alpha$) and in a spark ignition operating mode, in which the outlet valve is closed at a comparatively late closing time point with respect to the crank angle ($\alpha$), during the changeover from the spark ignition mode of operation to the compression ignition mode of operation, the closing time point of the outlet valve is transferred from the late closing time point to the early closing time point in steps distributed over multiple 4-stroke cycles.

It has been shown that, during the changeover of the operating mode, in conjunction with a sudden displacement of the closing time point of the outlet valve in the "early" direction, the high exhaust gas temperature initially still present from spark ignition Otto-cycle operation leads to an undesirably early ignition of the air/fuel mixture in the 4-stroke cycles of the subsequent compression ignition operation. The too early ignition is the cause of the undesirable brief lowering of the indicated average pressure, in conjunction with a sharp rise in the maximum pressure, which is the cause of increased noise emission and increased component loads.

By the closing time point of the outlet valve being adapted in steps from the late position, with respect to the crank angle, in Otto-cycle spark ignition operation toward the early position which is required for compression ignition operation, this affords a period of time which lasts for a plurality of 4-stroke cycles and in which the high exhaust gas temperature from Otto-cycle spark ignition operation can be lowered to a temperature level suitable for the compression ignition operation. In correlation with the lowering of the exhaust gas temperature, the closing time point of the outlet valve can be displaced in steps in the direction of "early" to an extent such that, under otherwise adapted operating conditions (for example, adaptation of the injection quantity), the induced average pressure remains approximately constant. In parallel with this, a continuous controlled rise in the maximum pressure from the comparatively low initial value in Otto-cycle spark ignition operation to the increased value in compression ignition operation is established. During this transition, an excessive pressure rise, along with the formation of pressure peaks, is avoided. The noise and component stresses are reduced considerably. It has been found that for a harmonious transition from Otto-cycle spark ignition operation to compression ignition operation, a change of the closing time point of the outlet valve distributed over at least five 4-stroke cycles is expedient.

In an expedient development of the method, during a changeover to the opposite operating mode, that is to say from compression ignition operation in the part-load range to Otto-cycle spark ignition operation, that is, from an early closing time point of the outlet valve to the late closing time point the valve closing times can be adjusted abruptly from one 4-stroke cycle to the next cycle. A direct changeover of the operating method takes place. After the changeover has taken place, the internal combustion engine is operated in Otto-cycle spark ignition operation, without transient operation over a plurality of cycles in compression ignition operation having to take place outside the parameter range provided for this purpose in the event of a rise in the external load. No adverse influences were observed. On the contrary, during the adaptation of the remaining operating parameters (for example, adaptation of the injection quantity), the indicated average pressure is essentially constant, while the exhaust gas temperature rises slowly and continuously.

For overall high efficiency operation in both operating modes and even during the change between the two operating modes in both directions, it is expedient to keep the opening time point of the outlet valve at least approximately constant in both operating modes.

In an advantageous development of the method, the control times of the inlet valve are also adaptable to respective operating modes. To improve compression ignition conditions, the inlet valve is in this case opened for a comparatively late period of time with respect to the crank angle. In both operating modes, overall, a high efficiency is established when, independently of the displacement of the opening time, the opening duration is in both cases approximately the same and remains the same even in the transition phase.

During the change of the operating mode from Otto-cycle spark ignition operation to compression ignition operation, and also vice versa, the displacement of the opening period of time of the inlet valve expediently takes place abruptly from one 4-stroke cycle to the next cycle. For optimizing the efficiency, the optimum position of the opening period of time is established immediately. No adverse influences on the pressure and temperature profile could be observed.

In an expedient development, during the change in operating mode from spark ignition operation to compression ignition operation, the displacement of the opening period of time of the inlet valve takes place before or at the commencement of the stepped transfer of the closing time point of the outlet valve. This takes into account the fact that, in spite of the stepped variation in the outlet valve control times, compression ignition operation is established, even at the commencement of this changeover, as a result of the high exhaust gas temperature which is still latently present. The control times for the inlet valve in this case lie at the commencement of the transition phase in the crank angle range adapted to compression ignition operation.

During the opposite change in the operating mode, that is to say from compression ignition operation in the direction of Otto-cycle spark ignition operation, it became apparent that a displacement of the opening period of time of the inlet valve, jointly with the transfer of the early closing time point of the outlet valve to the later closing time point and in this case abruptly from one 4-stroke cycle to the next cycle, is expedient. The displacement of the opening period of time of the inlet valve may also take place later. In the event of a joint displacement, however, an improved efficiency as a result of improved cylinder filling is obtained already at the commencement of spark ignition operation.

Below, an exemplary embodiment of the invention will be described in more detail with reference to the accompanying drawings:

DESCRIPTION OF PARTICULAR PROCEDURES

Figure 1:
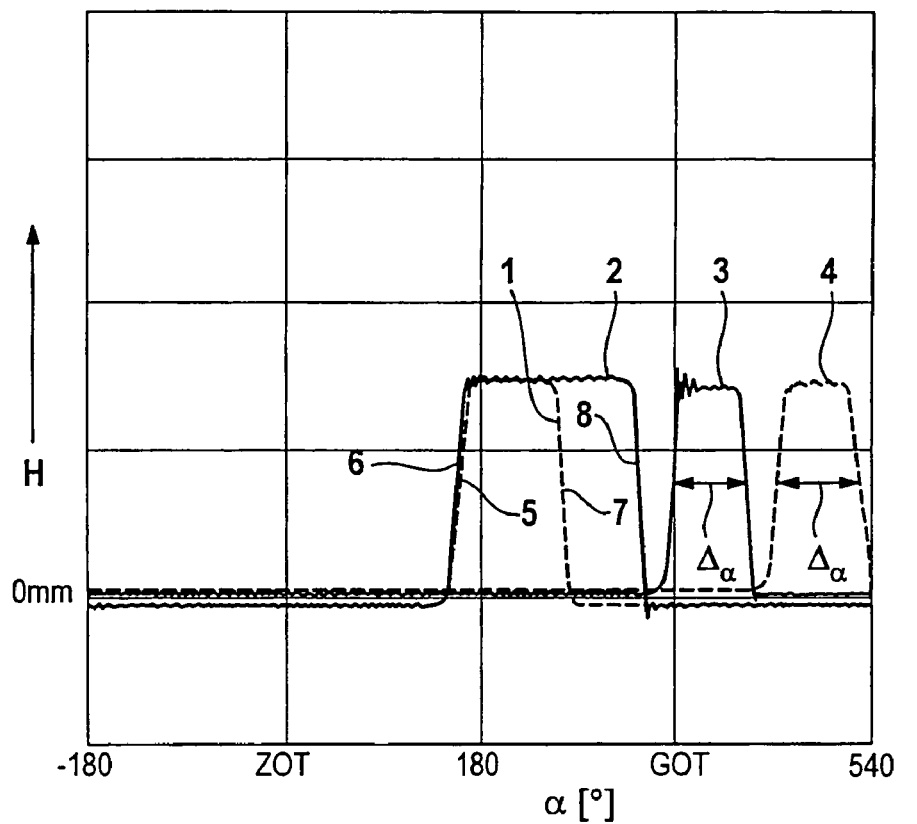
FIG. 1 shows a graphical illustration of the profile of the inlet and outlet valve stroke as a function of the crank angle and of the selected operating mode.

The graph according to FIG. 1 shows the valve stroke H of the inlet and outlet valves of a four-stroke internal combustion engine as a function of the crank angle $\alpha$. The crank angle $\alpha$, designated as ZOT, is 0° and constitutes ignition top dead center.

The 4-stroke internal combustion engine can be operated in two operating modes 9, 10 (FIG. 2), the first operating mode 9 being compression ignition operation and the second operating mode 10 being spark ignition operation. The profile of the opening and closing both of the inlet valve and of the outlet valve as a function of the crank angle $\alpha$ is illustrated by the stroke profile of the valve stroke H, a valve stroke H of 0 mm showing a closed valve. The unbroken lines show the valve stroke of the inlet and outlet valve in the second operating mode 10 of the spark ignition operation while the valve stroke H during the first operating mode 9 in compression ignition operation is illustrated by dashed lines. The curve 1 rising above the 0-line shows the opening period of time of the outlet valve in compression ignition operation; the unbroken line 2 shows the correspondingly varied opening period of time of the outlet valve in spark ignition operation.

Both opening periods of time commence, with respect to the crank angle $\alpha$, approximately at the same time point as the respective opening time point 5, 6 of the outlet valve, the opening time point 5 of the outlet valve in compression ignition operation both being at least approximately the same as the opening time point 6 of the outlet valve in spark ignition operation and, in the transition phases between these, lying uniformly at a crank angle $\alpha$ of about 170°.

In the second operating mode 10 (FIG. 2) of spark ignition operation, the outlet valve is opened over a comparatively long opening period of time 2 of nearly 180° duration and ends with a late closing time point 8. By contrast, the opening period of time of the outlet valve in the first operating mode 9 of compression ignition operation is comparatively short and ends at an early closing time point 7, thus resulting in an opening duration of about 90° to 100° with respect to the crank angle $\alpha$.

In spark ignition operation, the opening period of time 2 of the outlet valve is followed at only a short interval by the opening period of time 3 of the inlet valve. The inlet valve in this case has an opening duration $\Delta\alpha$ of about 70° at the crank angle $\alpha$. In comparison with the early opening period of time 3 of the inlet valve during spark ignition operation, in compression ignition operation the inlet valve has a late opening period of time 4 which is retarded by the amount of about 90° and the opening duration $\Delta\alpha$ of which is equal to the opening duration $\Delta\alpha$ of the earlier opening period of time 3 of the inlet valve for spark ignition operation.

Figure 2:
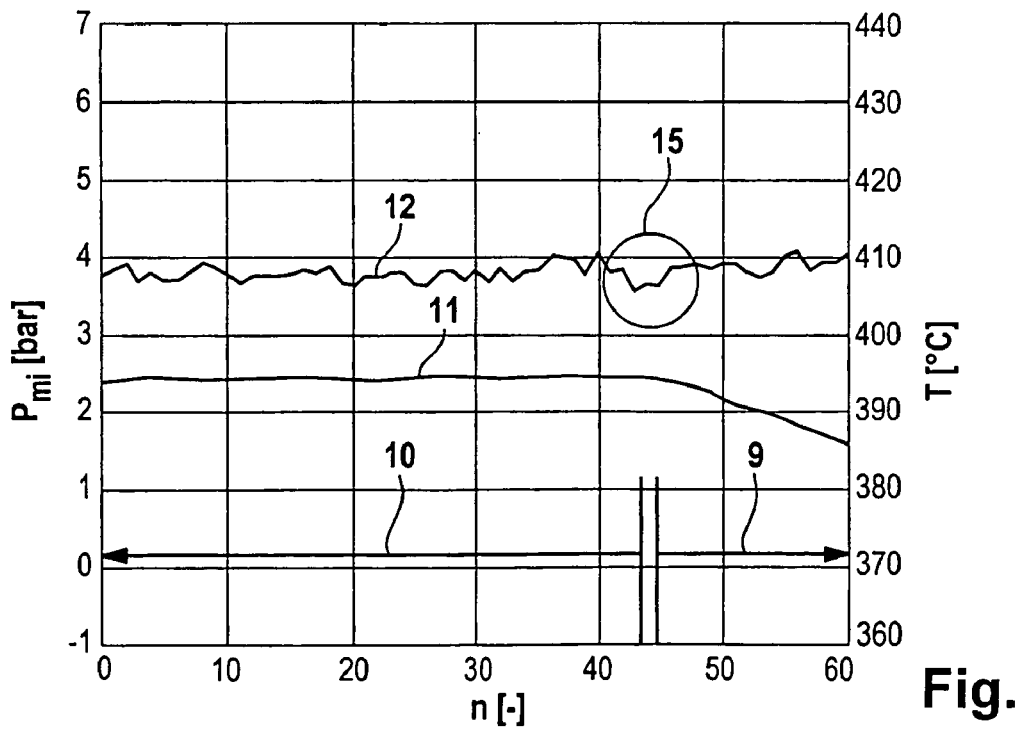
FIG. 2 shows, in the form of a graph, the profile of the exhaust gas temperature and induced average pressure in the case of a sudden adjustment of the control times in conjunction with a change from spark ignition operation to compression ignition operation.

The graph according to FIG. 2 plots the profile of the induced average pressure $P_{mi}$ and of the exhaust gas temperature T against a number of 4-stroke cycles n, the first cycles n being operated in the second operating mode 10 of spark ignition operation. If after, for example, 44 cycles n, to illustrate possible occurrence of problems arising, there is a sudden changeover of the valve control times according to FIG. 1 to the second operating mode 9 of compression ignition operation the pressure will suddenly rise.

During continuous operation of the internal combustion engine in the second operating mode 10, as a result of spark ignition operation, a comparatively high exhaust gas temperature T is established, the profile of which is illustrated by way of example by the curve 11 and amounts, during continuous operation in the second operating mode 10, to about 395° C. After the changeover from the second operating mode 10 to the first operating mode 9, the exhaust gas temperature T drops continuously over a plurality of cycles n.

The profile of the induced average pressure $P_{mi}$, as illustrated by the curve 12, is approximately constant at 3.6 bar in both operating modes 10, 9. In the transition region, marked by a circle 15, from the second operating mode 10 of spark ignition operation to the first operating mode 9 of compression ignition operation, the induced average pressure $P_{mi}$ is lowered over the course of a few cycles n.

Figure 3:
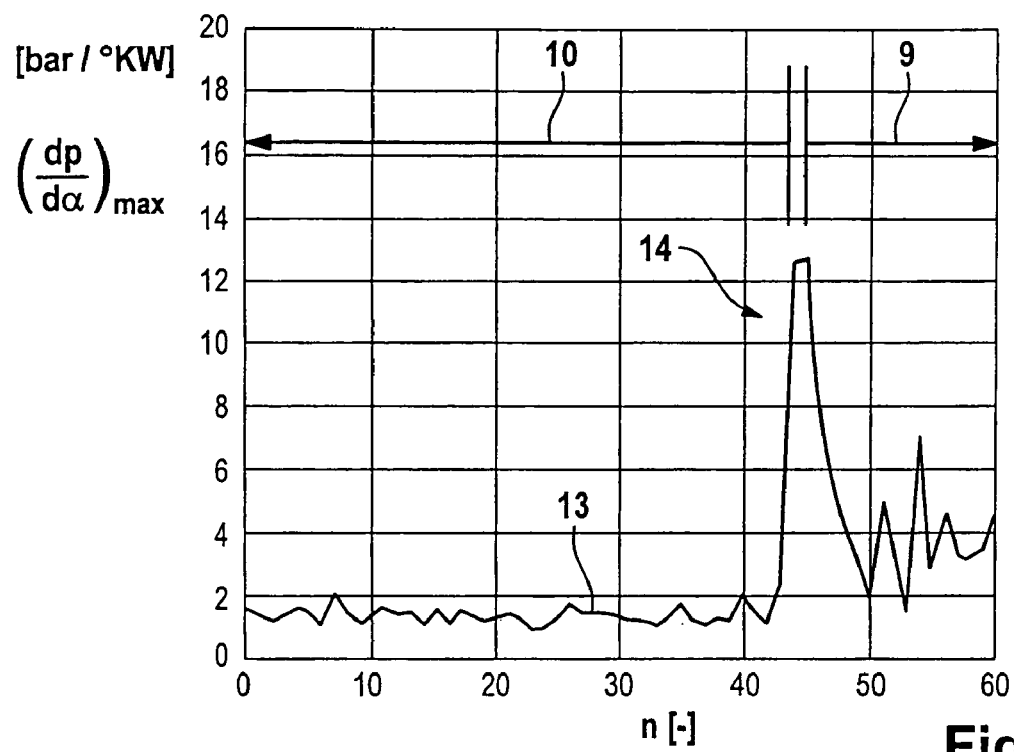
FIG. 3 shows a supplemented illustration of the graph according to FIG. 2 with the profile of the maximum rise in the cylinder pressure.

An addition to the graph according to FIG. 2 is illustrated in FIG. 3, according to which a curve 13 illustrates the profile of the maximum pressure rise $$\left(\frac{dp}{d\alpha}\right)_{max}.$$

The maximum pressure rise $$\left(\frac{dp}{d\alpha}\right)_{max}$$

has a low value in spark ignition operation 10 and is increased, as compared with this, in the compression ignition mode of operation 9. In the transition region between these and simultaneous with the point 15 of the lowered induced average pressure $P_{mi}$ (FIG. 2), a point 14 with a markedly increased pressure rise can be seen in the profile 13 of the maximum pressure rise $$\left(\frac{dp}{d\alpha}\right)_{max}.$$

At the same time, the profile 11 of the exhaust gas temperature T (FIG. 2) still has a comparatively high value, as a result of which, at the commencement of compression ignition operation 9 in the first associated cycle n, ignition takes place too early with respect to the crank angle α (FIG. 1). The early ignition causes the peak 14 in the maximum pressure rise $$\left(\frac{dp}{d\alpha}\right)_{max}$$

and the lowering 15 (FIG. 2) of the induced average pressure $P_{mi}$. As a result of the occurrence of the peak 14 in the profile 13 of the maximum pressure rise $$\left(\frac{dp}{d\alpha}\right)_{max},$$

increased noise emission and increased component load occur.

Figure 4:
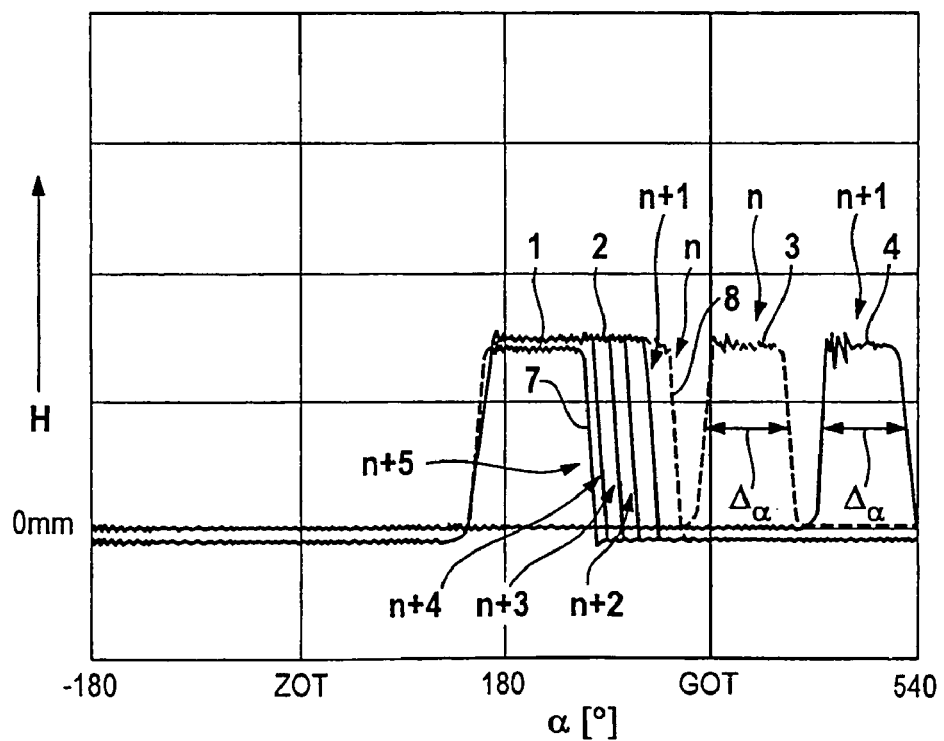
FIG. 4 shows a graphical illustration according to FIG. 1 with closing times of the outlet valve being changed over a plurality of 4-stroke cycles.

According to the graph in FIG. 4, it is proposed in the invention that the 4-stroke internal combustion engine first be operated in the second operating mode 10 with Otto-cycle spark ignition (FIG. 2, 3). In this case, a profile 2 of the outlet valve opening with a late closing time point 8 and with an early opening period of time 3 up to the last 4-stroke cycle n of spark ignition operation 10 is provided. A change subsequently takes place from spark ignition operation 10 to compression ignition operation 9 which extends over a plurality of 4-stroke cycles n. For this purpose, there is a sudden change of the early opening period of time 3 of the inlet valve toward a late opening period of time 4 which is established as early as during the subsequent cycle n+1. There may also be provision for the displacement of the opening period of time of the inlet valve to take place during earlier cycles n–x, in such a way that the late opening period of time 4 is formed even during the last cycle n of spark ignition operation 10.

The transfer of the closing time point of the outlet valve from the late closing time point 8 during the cycle n to an early closing time point 7 takes place over a plurality of 4-stroke cycles n. In the exemplary embodiment shown, starting from the late position 8 in spark ignition operation, the closing time point is displaced in steps over altogether five cycles n+1, n+2, n+3, n+4 and n+5 in the direction of "early", the early position 7 of the closing time point for continuous compression ignition operation 9 being reached in the fifth cycle n+5 after the commencement of the changeover. In the exemplary embodiment shown, the stepped displacement of the closing time point takes place at uniform intervals. Progressive, regressive or otherwise adapted angular steps of the crank angle α may also be expedient, and a greater number of steps than the five cycles n shown may likewise be selected, as required.

Figure 5:
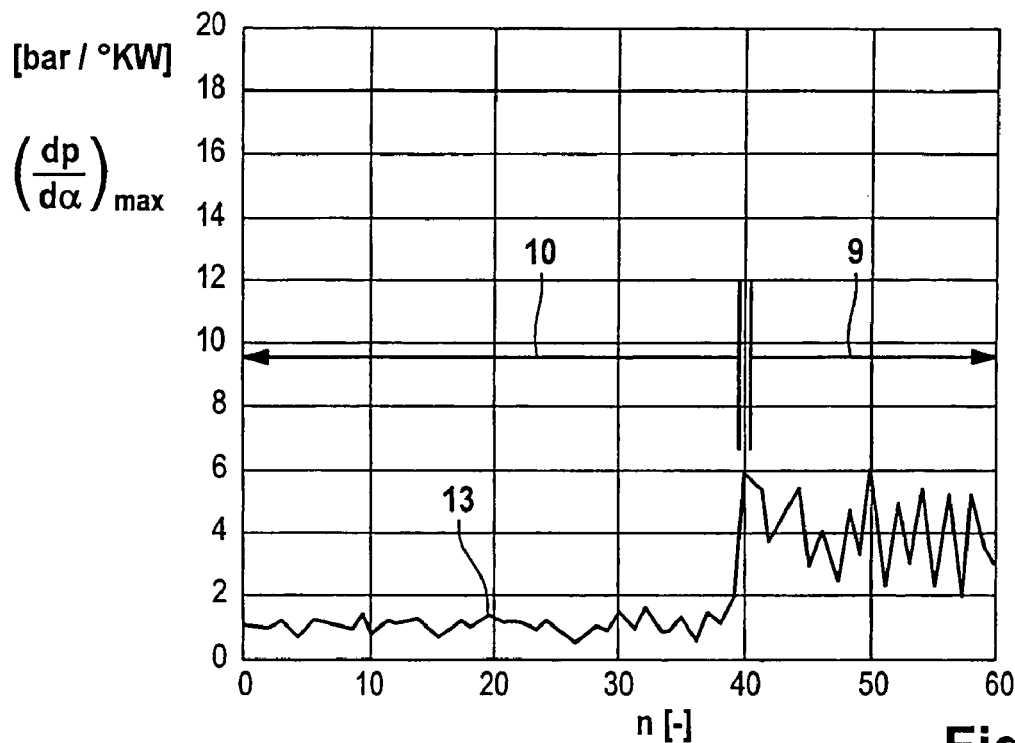
FIG. 5 shows an illustration of the profile of the maximum rise in the cylinder pressure in the case of a changeover in the control times according to FIG. 4.

FIG. 5 shows the profile 13 of the maximum pressure rise $$\left(\frac{dp}{d\alpha}\right)_{max}$$

during the change in operating mode according to FIG. 4. In the region of the second operating mode 10 of spark ignition operation, a low pressure rise $$\left(\frac{dp}{d\alpha}\right)_{max}$$

is established, which, (as compared with this value), is increased during of continuous compression ignition operation of the first operating mode 9. In the transition region between the two operating modes 10, 9, in comparison with the illustration according to FIG. 3, no pressure peak in the profile 13 of the maximum pressure rise $$\left(\frac{dp}{d\alpha}\right)_{max}$$

occurs on account of the stepped displacement of the closing time point of the outlet valve according to FIG. 4. Correspondingly, the profile 12 of the indicated medium pressure $P_{mi}$ according to FIG. 2 also has no trough at the point 15.

Figure 6:
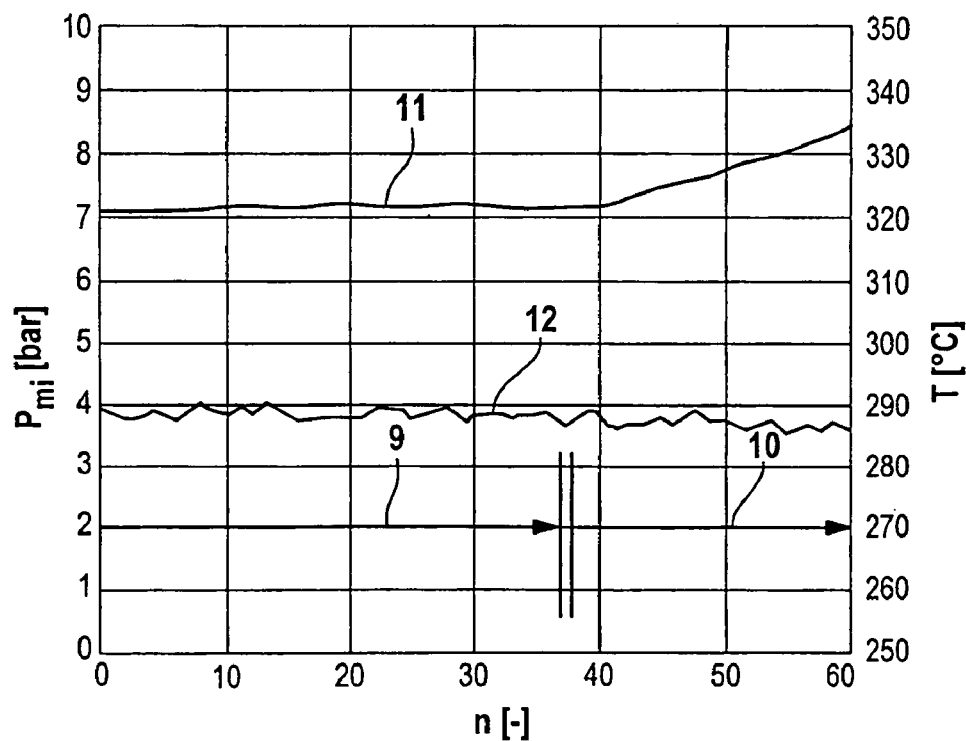
FIG. 6 shows a graphical illustration of the profile of the exhaust gas temperature and indicated average pressure in the case of a change from compression ignition operation to spark ignition operation.

FIG. 6 shows a graphical illustration of the profile 11 of the exhaust gas temperature T and the profile 12 of the indicated average pressure $P_{mi}$ during a change in operating mode in the opposite direction from the first operating mode 9 of compression operation to the second operating mode 10 of spark ignition operation. In this case, a displacement of the closing time point of the outlet valve from the early closing time point 7 to the late closing time point 8 takes place concurrently with the displacement of the late opening period of time 4 of the inlet valve to the early opening period of time 3 from one cycle n to the subsequent n+1 cycle (FIG. 1). The profile 12 of the indicated average pressure $P_{mi}$ is in this case essentially constant according to FIG. 6 without a detectable trough, while the profile 11 of the exhaust gas temperature T, starting from a continuous compression ignition operation 9 with an approximately constant low value T, rises to the second operating mode 10 with spark ignition operation after the change in operating mode has taken place and, finally, in continuous spark ignition operation 10, assumes a high value according to FIG. 2.

The curves shown by way of example were determined at a constant rotational speed of 950 min$^{-1}$, the indicated average pressure $P_{mi}$ amounting to about 3.6 bar with the exception of a few deviations. Taking into account the different efficiency during spark ignition operation and during compression ignition operation, an adapted fuel quantity was injected in both operating modes 9, 10. The approximately constant indicated average pressure $P_{mi}$ in conjunction with the constant rotational speed corresponds to a uniform load which was selected here for the sake of better comparability.

However, the method shown here by way of example can be applied particularly in the case of changing load conditions, the first operating mode 9 of compression ignition operation being used preferably for the part-load range and the second operating mode 10 of spark ignition operation being used preferably for the range of higher load. It may be expedient, in particular, in the case of different load jumps, also to select an adapted different number of cycles n for the displacement of the closing time point of the outlet valve.

What is claimed is:

1. A method of operating a 4-stroke internal combustion engine in a first operating mode (9) which is a compression ignition operating mode, in which an outlet valve of the internal combustion engine is closed at a comparatively early closing time point (7) with respect to a crank angle ($\alpha$), and in a second operating mode (10) which is a spark ignition operating mode, in which the outlet valve is closed at a comparatively late closing time point (8) with respect to the crank angle ($\alpha$), comprising the steps of: transferring, during the change of the operating mode from the spark ignition operating mode (10) to the compression ignition operating mode (9), the closing time point of the outlet valve in steps, distributed over a plurality of 4-stroke cycles (n), from the late closing time point (8) to the early closing time point (7).

2. The method as claimed in claim 1, wherein the displacement of the closing time point of the outlet valve is distributed over at least five 4-stroke cycles (n+1, n+2, n+3, n+4, n+5).

3. The method as claimed in claim 1, wherein, during the change in operating mode from the first mode (9) of compression ignition operation to the second operating mode (10) of spark ignition operation, the early closing time point (7) of the outlet valve is transferred to the late closing time point (8) from one 4-stroke cycle (n) to the next cycle (n+1).

4. The method as claimed in claim 1, wherein an opening time point (5, 6) of the outlet valve remains at least approximately constant during the change in operating mode.

5. The method as claimed in claim 1, wherein, in the first operating mode (9) of compression ignition operation, an inlet valve is opened over a comparatively late period of time (4) with respect to the crank angle ($\alpha$), and, in the second operating mode (10) of spark ignition operation, the inlet valve is opened over a comparatively early period of time (3), the opening duration ($\Delta\alpha$) being approximately the same in both operating modes (9, 10).

6. The method as claimed in claim 1, wherein, during the change in operating mode from the second operating mode (10) of spark ignition operation to the first operating mode (9) of compression ignition operation, the displacement of the early opening period of time (3) of the inlet valve to the late opening period of time (4) takes place from one 4-stroke cycle (n) to the next cycle (n+1).

7. The method as claimed in claim 6, wherein the displacement takes place before, or at the commencement of, the stepped transfer of the closing time point of the outlet valve.

8. The method as claimed in claim 1, wherein, during the change from the first operating mode (9) of compression ignition operation to the second operating mode (10) of spark ignition operation, the displacement of the late opening period of time (4) of the inlet valve to the early opening period of time (3) takes place from one 4-stroke cycle (n) to the next cycle (n+1).

9. The method as claimed in claim 8, wherein the displacement takes place concurrently with the transfer of the early closing time point (7) of the outlet valve to the late closing time point (8) from one 4-stroke cycle (n) to the next cycle (n+1).

* * * * *